(12) United States Patent
Nishimura et al.

(10) Patent No.: US 9,314,045 B2
(45) Date of Patent: Apr. 19, 2016

(54) MEAT-LIKE FOODSTUFF AND METHOD FOR PRODUCING THE SAME

(75) Inventors: Shimpei Nishimura, Osaka (JP); Naoko Umetsu, Osaka (JP); Shoji Takata, Osaka (JP)

(73) Assignee: HOUSE FOODS CORPORATION, Higashiosaka-shi (JP)

( * ) Notice: Subject to any disclaimer, the term of this patent is extended or adjusted under 35 U.S.C. 154(b) by 249 days.

(21) Appl. No.: 14/006,409

(22) PCT Filed: Mar. 23, 2011

(86) PCT No.: PCT/JP2011/057927
§ 371 (c)(1),
(2), (4) Date: Sep. 20, 2013

(87) PCT Pub. No.: WO2012/127694
PCT Pub. Date: Sep. 27, 2012

(65) Prior Publication Data
US 2014/0010920 A1    Jan. 9, 2014

(51) Int. Cl.
A23J 3/16 (2006.01)
A23J 3/22 (2006.01)
A23J 3/26 (2006.01)

(52) U.S. Cl.
CPC .... A23J 3/16 (2013.01); A23J 3/22 (2013.01); A23J 3/227 (2013.01); A23J 3/26 (2013.01)

(58) Field of Classification Search
CPC ..................................... A23J 3/16; A23J 3/22
See application file for complete search history.

(56) References Cited

U.S. PATENT DOCUMENTS

| 4,755,393 | A | 7/1988 | Toba et al. |
| 4,911,945 | A | 3/1990 | Kawasaki et al. |
| 6,187,367 | B1 | 2/2001 | Cho et al. |
| 6,579,562 | B1 * | 6/2003 | Darke ........................... 426/656 |
| 6,635,301 | B1 * | 10/2003 | Howsam ........................ 426/574 |

FOREIGN PATENT DOCUMENTS

| CN | 1323543 A | 11/2001 |
| JP | 60-156345 A | 8/1985 |
| JP | 63-071152 A | 3/1988 |
| JP | 63-133949 A | 6/1988 |
| JP | 2-041315 B2 | 9/1990 |
| JP | 6-006030 A | 1/1994 |
| JP | 2008-061592 A | 3/2008 |
| JP | 2010-200627 A | 9/2010 |
| JP | 2011-072264 A | 4/2011 |

OTHER PUBLICATIONS

Office Action issued May 5, 2014, in Chinese Patent Application No. 201180069506.2.
Altschul, Aaron M., "New Protein Foods," Food Science and Technology A Series of Monographs, vol. 1, Technology, Part A, pp. 382-385.
International Search Report issued in PCT/JP2011/057927, mailed on Jun. 28, 2011.
Written Opinion issued in PCT/JP2011/057927, mailed on Jun. 28, 2011.
Lin Shu-Shian, "The study about the physical property relate to sensory quality and the fittest quality deciding of market sellling Texturized Vegetable Protein (TVP)," National Taiwan Ocean University, Department of Food Science, Master Dissertation, Jun. 2006.
Office Action issued Aug. 26, 2015, in Taiwan Patent Application No. 100110506.
English abstract of JP 48-003388 B2 published Jan. 30, 1973.

* cited by examiner

*Primary Examiner* — Elizabeth Gwartney
(74) *Attorney, Agent, or Firm* — Birch, Stewart, Kolasch & Birch, LLP

(57) ABSTRACT

The objective of the present invention is to provide a meat-like foodstuff that can provide a natural meat-like texture experienced when chewing and is also similar in appearance to natural meat. A meat-like foodstuff that can achieve the above objective can be obtained by molding a raw-material mixture to produce a molded product and then coagulating the product by heating. The raw-material mixture comprises: a first hydrated and split textured vegetable protein obtained by hydrating and splitting a first textured vegetable protein having been textured by extruder treatment so as to contain a vegetable protein and 0.17 to 0.76 parts by mass of starch with respect to 1 part by mass of the vegetable protein; a hydrated and split second textured vegetable protein obtained by hydrating and splitting a second textured vegetable protein having been textured by extruder treatment so as to contain a vegetable protein and 0.03 to 0.15 parts by mass of starch with respect to 1 part by mass of the vegetable protein; and a binder.

10 Claims, 2 Drawing Sheets
(2 of 2 Drawing Sheet(s) Filed in Color)

A

B

C

A

B

MEAT-LIKE FOODSTUFF AND METHOD FOR PRODUCING THE SAME

TECHNICAL FIELD

The present invention provides a meat-like foodstuff that can be used as a meat analog and a method for producing the same.

BACKGROUND ART

Meat-like foodstuff materials have been developed as inexpensive alternatives to animal proteins. Today, meat-like foodstuff materials have received attention again as low-calorie food materials or livestock meat alternative materials for patients with diseases that require them to limit their consumption of animal protein. The conventional techniques concerning such meat-like foodstuffs are described below as examples.

Patent document 1 describes a method for producing a vegetable protein food characterized by mixing:
aggregated tissue-like vegetable proteins having particle sizes ranging from 10 mm to 30 mm;
10 to 40 weight percent of tissue-like vegetable proteins, among which those having maximum particle sizes of less than 10 mm and particle sizes ranging from 1 mm to 5 mm account for at least 70 weight percent of the total amount of such tissue-like vegetable proteins;
5 to 40 weight percent of fibrous vegetable proteins with fiber lengths ranging from 5 mm to 30 mm; and a binder, and molding and coagulating the mixture by heating. Patent document 1 states that a texture analogous to that of natural meat experienced when chewing can be imparted to a food material prepared by incorporating aggregated tissue-like vegetable proteins having particle sizes ranging from 10 mm to 30 mm. Patent document 1 further describes that such aggregated tissue-like vegetable proteins having particle sizes of less than 10 mm make it difficult to obtain a texture analogous to that of natural meat.

Patent document 2 also discloses, as a technique for providing a meat-like food with tissue and a texture analogous to those of one slice of meat such as a slice of steak, a method for producing a meat-like food characterized by mixing a fibrous protein material and a binder with a lump of meat-like protein material obtained by molding either a fibrous protein precursor that becomes fibrous when cooled or a thermoplasticized fibrous protein material into the form of a lump of meat, and then molding the mixture. The above material in the form of a lump of meat has a cross-sectional area of approximately 1 cm², which is produced by pressurizing and heating with a heat exchanger or the like and then extruding the resultant through an outlet. A meat-like food is formed using a portion of the above material in the form of a lump of meat and a portion in which fibrous proteins are dispersed throughout the binder. Patent document 2 further states that when the "lump" is too small in size, the overall firm texture required for a slice of meat becomes weaker. As in the patent document 3 described below, patent document 2 does not describe the use of a material in the form of a lump of meat after defibration.

Patent document 3 discloses a method for producing a meat-like food, which is characterized by mixing an O/W emulsion, a fibrous protein obtained by kneading a vegetable protein-containing substance with water, applying shearing stress to the mixture while heating it for orientation, and then splitting the resultant; and a binder, and after mixing with the O/W emulsion accounting for 5 to 50 weight percent of the meat-like food, the mixture is molded and heated. According to patent document 3, combining the O/W emulsion with the fibrous protein causes oil to spread throughout the mouth when the meat-like food is chewed, so that a juicy sensation equivalent to that of natural meat can be obtained, and a fibrous texture very similar to that of natural meat can also be obtained.

Patent document 4 describes a bundle of membranous foods having a thin membranous structure, which is obtained by pressurization and heating with the use of a twin-screw extruder. This food contains 0.17 to 0.76 weight percent of starch with respect to 1 part by weight of oil seed protein, and is torn into thin nearly concentric membranes in the extrusion direction when restored to a normal state using hot water. The food described in patent document 4 is intended to be used as an alternative for yuba (bean curd skin). Patent document 4 does not describe the production of any meat-like foodstuff.

CITATION LIST

Patent Documents

Patent document 1: JP Patent publication (Kokoku) No. 48-3388 (1973)
Patent document 2: JP Patent Publication (Kokai) No. 60-156345 A (1985)
Patent document 3: JP Patent publication (Kokoku) No. 2-41315 (1990)
Patent document 4: JP Patent publication (Kokoku) No. 6-6030 (1994)

Non-Patent Documents

Non-patent document 1: New Protein Foods, Volume 1, Terminology, Part A, Edited by Aaron M. Altschul, Academic Press

SUMMARY OF THE INVENTION

The meat-like foodstuffs described in patent documents 1 and 2, which are produced from aggregated vegetable proteins, fibrous vegetable proteins, and a binder, contain relatively large aggregates or lumps of vegetable proteins. The present inventors reproduced such a meat-like foodstuff. As a result, a problem was revealed in that an unnatural resilient texture was produced when the meat-like foodstuff was processed and prepared into the shape of meat for a steak or cutlet with a thickness of 15 mm or more, or into the shape of cubes of meat (15 mm or more×15 mm or more×15 mm or more) for boiling or stewing (e.g., curry and stew). Another problem was also revealed during boiling or stewing, in that the flavor permeated the portions of the aggregated vegetable proteins poorly. Furthermore, the meat-like foodstuff was also problematic in that it differed from natural meat in appearance, which produced a sense of discordance, because it contained aggregated vegetable proteins.

Meanwhile, when the present inventors reproduced the meat-like food of patent document 3, it had a texture that produced a sense of discordance. This was because fibrous proteins firmly bind to each other.

Hence, the objective of the present invention is to provide a meat-like foodstuff that can provide a texture similar to that of natural meat experienced when chewing and has an appearance that is visually similar to that of natural meat.

The present invention relates to (1) to (10).
(1) A method for producing a meat-like foodstuff, comprising coagulating by heating a raw-material mixture containing:

a hydrated and split first textured vegetable protein that is obtained by hydrating and splitting a first textured vegetable protein having been textured by extruder treatment so as to contain a vegetable protein and 0.17 to 0.76 parts by mass of starch with respect to 1 part by mass of the vegetable protein;

a hydrated and split second textured vegetable protein that is obtained by hydrating and splitting a second textured vegetable protein having been textured by extruder treatment so as to contain a vegetable protein and 0.03 to 0.15 parts by mass of starch with respect to 1 part by mass of the vegetable protein; and a binder.

(2) The method of (1), wherein the hydrated and split first textured vegetable protein content calculated on a dry basis ranges from 20 to 90 mass percent with respect to the total amount of the hydrated and split first textured vegetable protein and the hydrated and split second textured vegetable protein calculated on a dry basis.

(3) The method of (1) or (2), wherein the hydrated and split first textured vegetable protein fibers include those having a thickness ranging from 0.1 mm to 6 mm, and the hydrated and split second textured vegetable protein fibers include those having a thickness ranging from 0.1 mm to 12 mm.

(4) The method of any one of (1) to (3), wherein the hydrated and split first textured vegetable protein fibers include those having a length of 5 mm or more, and the hydrated and split second textured vegetable protein fibers include those having a length of 5 mm or more.

(5) The method of any one of (1) to (4), wherein the vegetable protein contained in the first and second textured vegetable protein contains a soy protein as a major ingredient.

(6) The method of any one of (1) to (5), wherein the binder is one or more members selected from the group consisting of a vegetable protein, an animal protein, and a polysaccharide.

(7) The method of any one of (1) to (6), wherein at least one binder forms a heat reversible gel when hydrated, and the raw-material mixture contains the binder in the form of hydrated heat reversible gel.

(8) The method of any one of (1) to (7), wherein the raw-material mixture further contains an enzyme for protein adhesion.

(9) A meat-like foodstuff, which is produced by the method of any one of (1) to (8).

(10) A meat-like foodstuff, which contains:

a hydrated and split first textured vegetable protein that is obtained by hydrating and splitting a first textured vegetable protein having been textured so as to contain a vegetable protein and 0.17 to 0.76 parts by mass of starch with respect to 1 part by mass of the vegetable protein;

a hydrated and split second textured vegetable protein that is obtained by hydrating and splitting a second textured vegetable protein having been textured so as to contain a vegetable protein and 0.03 to 0.15 parts by mass of starch with respect to 1 part by mass of the vegetable protein; and a binder, in a mixed state, such that they are combined together by coagulation.

BRIEF DESCRIPTION OF THE DRAWINGS

The patent or application file contains at least one color drawing. Copies of this patent or patent application publication with color drawing will be provided by the USPTO upon request and payment of the necessary fee.

FIG. 1A shows a block of meat, FIG. 1B shows a slice of steak meat, and FIG. 1C shows a grilled slice of meat.

Both

EMBODIMENTS FOR CARRYING OUT THE INVENTION

1. Textured Vegetable Protein

Figure 1:
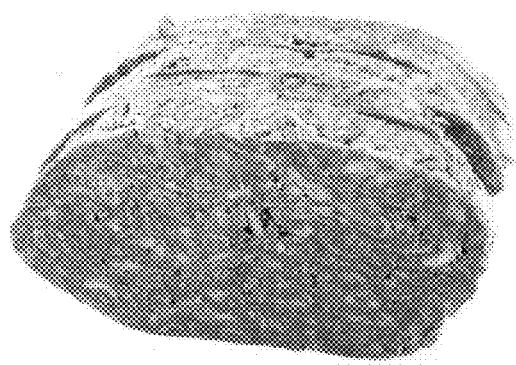
FIG. 1 shows photographs showing the appearance of the meat-like foodstuff of Example 1-1.
Figure 1:
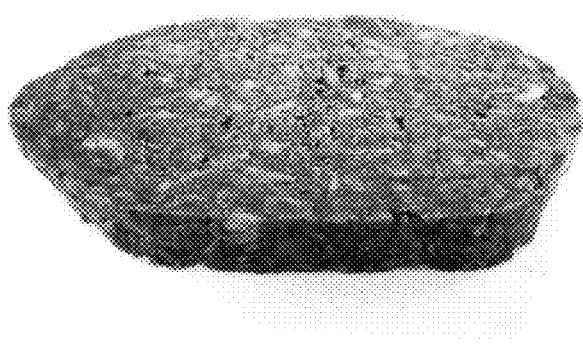
Figure 1:
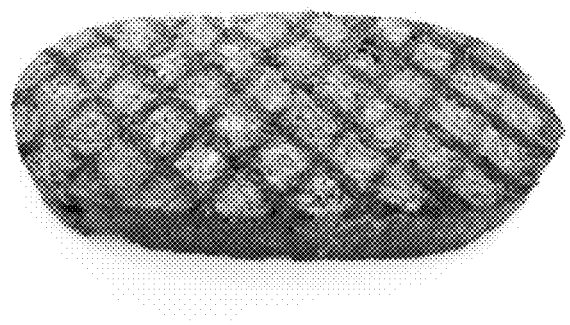

The term "hydrated and split first textured vegetable protein" in the present invention refers to a fibrous structure product prepared via hydration and defibration of a first textured vegetable protein textured by extruder treatment so as to contain a vegetable protein and 0.17 to 0.76 parts by mass of starch with respect to 1 part by mass of the vegetable protein.

The term "hydrated and split second textured vegetable protein" in the present invention refers to a fibrous structure product prepared via hydration and defibration of a second textured vegetable protein textured by extruder treatment so as to contain a vegetable protein and 0.03 to 0.15 parts by mass of starch with respect to 1 part by mass of the vegetable protein. The above ratio of a vegetable protein to starch is calculated on a dry basis.

Examples of vegetable protein raw materials that are major ingredients composing the first textured vegetable protein and the second textured vegetable protein include oil seed proteins such as a soy protein, a rapeseed protein and a peanut protein, and a wheat protein. In particular, a soy protein is preferred. As soy proteins, soybean powder, and delipidized soybean powder (or flakes) may be used. Moreover, powdered soy protein (isolated soy protein) may also be used herein. As a wheat protein, wheat flour or wheat gluten can also be used. Furthermore, these raw materials can be processed to increase the protein content and then used as vegetable protein raw materials. The mass of a vegetable protein to be used as the basis of the starch content refers to the total mass (calculated on a dry basis) of vegetable protein raw materials that may also contain ingredients other than proteins as chemical substances, such as delipidized soybean powder (or flakes) or powdered soy protein. Vegetable protein raw materials to be used in the present invention typically contain about 50 to 80 mass percent of proteins (calculated on a dry basis).

As starch composing the first textured vegetable protein and the second textured vegetable protein, starch that is generally used for production of textured vegetable proteins can be used. Specifically, powders of grains such as rice, wheat, and corn, starch obtained therefrom, powders of potatoes such as Irish potatoes, sweet potatoes, and cassaya, starch obtained therefrom, and various other processed starch products can be used. Particularly preferable starch is starch (corn starch) that is obtained from corn. In the present invention, the mass of starch refers to a total mass (calculated on a dry basis) of starch raw materials that may contain also an ingredient(s) other than starch as a chemical substance (e.g., grain powders or potato powders).

In the present invention, the "first textured vegetable protein" and the "second textured vegetable protein" are "granular vegetable protein" as defined under the "Japanese Agricultural Standards (JAS) for vegetable proteins", or vegetable proteins having meat-like tissue equivalent to that of the "granular vegetable protein". According to the "Japanese Agricultural Standards for vegetable proteins," granular vegetable proteins are defined as "vegetable proteins that are molded into granular shapes or flakes, and, have meat-like tissue." According to Article 5 of the standards, the vegetable protein content of a granular vegetable protein is 52% or more (as measured by the measurement method as specified in Article 7 of the standards). Examples of vegetable proteins having meat-like tissue equivalent to that of "granular vegetable proteins," but not falling under the category of the "granular vegetable proteins" as defined under the standards include those satisfying the requirements of "granular vegetable proteins" as defined in the standards except for the point that they contain another ingredient such as citric acid (mainly it can be used as a texture-improving agent).

The measurement method for vegetable proteins specified under the Japanese Agricultural Standard (Article 7) is specifically described as follows: 0.5 g to 3 g of a sample is measured off, and then the total nitrogen content is measured using the KjeL/Dahl method. The result is multiplied by 6.25 when the main raw material is soybean or delipidized soybean, 5.70 when the main raw material is wheat flour or wheat gluten, or a weighted average coefficient based on the proportions of the components when the sample is a mixture of a component containing soybean or delipidized soybean as the main raw material and a component containing wheat flour or wheat gluten as the main raw material. The thus calculated value is designated as the rough protein weight. The percentage accounted for by the rough protein weight with respect to the weight of the sample (calculated on the basis of the weight of the dried one) is designated as the vegetable protein content.

A method for preparing textured vegetable proteins such as granular vegetable proteins is already widely known. For example, such a method is described in non-patent document 1 (pages 383 to 385) or patent document 4. Typically, a textured vegetable protein is prepared by subjecting a vegetable protein raw material, and a raw material containing starch or the like to extruder treatment, treating under conditions for pressurization and heating, and then texturing via extrusion from a die. The preparation method is further specifically described as follows.

A mixture containing at least a vegetable protein raw material and starch, and further containing fats and oils, water, a pigment, a flavor, and the like as necessary is pressurized and heated with an extruder, and then discharged from the tip of a die under normal pressure to expand. The expanding product obtained by this process (this may also be referred to as "extruder treatment" in the present invention) has a orientational fibrous structure internal tissue (that is, "textured"). Typically, after being restored to a normal state with hot water, the tissue is formed such that it can be torn along the fiber direction and the direction of extrusion by the extruder treatment. Any extruder can be used herein as long as it is a device with which a raw material can be textured by pressurization and heating. Specifically, devices with names other than "extruder" can also be used herein, as long as a raw material can be textured by pressurization and heating. As extruders, a twin-screw extruder and a uniaxial extruder can also be used herein, and a twin-screw extruder is particularly preferred. The thus obtained expanding product is cut into an appropriate size and then dried if necessary, so that a textured vegetable protein can be obtained.

When the first textured vegetable protein is produced, a raw-material mixture containing a vegetable protein and 0.17 to 0.76 parts by mass of starch with respect to 1 part by mass of the vegetable protein is subjected to extruder treatment. When the second textured vegetable protein is produced, a raw-material mixture containing a vegetable protein and 0.03 to 0.15 parts by mass of starch with respect to 1 part by mass of the vegetable protein is subjected to extruder treatment.

The types of and combination ratios of other raw materials in a raw-material mixture to be subjected to extruder treatment, conditions for extruder treatment such as pressure, temperature, and die shape can be appropriately selected depending on target texture. As other raw materials, those selected from among vegetable fats and oils, common salt, table sugars, spices, concentrates of animal or plant extracts, protein hydrolysates, calcium sulfate (tissue-improving agent), disodium 5'-inosinate, disodium 5'-guanylate, monosodium L-glutamate, and disodium 5'-ribonucleotide acid (seasonings), colorants, L-ascorbic acid (antioxidant), aroma chemical, and the like can be appropriately used. The first textured vegetable protein and the second textured vegetable protein can be prepared in combination with raw materials according to the JAS.

The conditions for the extruder treatment are as follows. For example, a vegetable protein raw material and a raw material containing starch and the like are drawn using a twin-screw extruder (L/D=15, D=46 mm) under the conditions of 30 Kg/Hr (feed amount of raw materials), 30% added water, barrel heating at 150° C., and a screw speed of 200 RPM. Specifically, the mixture is drawn while being extruded through a slit die having an opening (3×15 mm) and a thickness of 10 mm in the flow direction of the raw materials provided at the tip portion of the twin-screw extruder and a guide for the formation connected to the die (12 mm×17 mm, with a thickness of 10 mm), thereby cutting it into lengths of about 60 mm.

Examples of the shape of the first textured vegetable protein and the shape of the second textured vegetable protein to be produced by extruder treatment include, but are not particularly limited to, granular shapes, rodlike shapes, and flakes. All textured vegetable proteins shaped into these shapes are included in the "first textured vegetable protein" or the "second textured vegetable protein" in the present invention. The first textured vegetable protein or the second textured vegetable protein to be produced by extruder treatment is dried to have a water content of about 10 mass percent or less, and then the resultant can be used for hydration and defibration treatment. Alternatively, the first textured vegetable protein or the second textured vegetable protein to be produced by extruder treatment is frozen and then the resultant can be used for hydration and defibration treatment.

The first textured vegetable protein and the second textured vegetable protein are caused to contain water for hydration. Then, the excess water is dehydrated as necessary. The hydrate is split using an appropriate means; that is, disintegrated into fibers. Hydration can be performed by immersing the dried first textured vegetable protein and dried second textured vegetable protein in water or hot water. An example of such means for defibration is a method that involves counter-rotating blades of a food cutter and then splitting with the blunt blades. (Such a food cutter is generally employed for shearing or cutting a raw food material or the like with its rotary blades. For example, a food cutter produced by Nihon Choriki Co., Ltd. can be used.)

The thus hydrated and split first textured vegetable protein fibers preferably include those having a thickness ranging from 0.1 mm to 6 mm, and preferably a thickness ranging from 1 mm to 5 mm. The hydrated and split first textured vegetable protein fibers having such a thickness account for, on the basis of wet mass, 40 mass percent or more, and more preferably 50 mass percent or more with respect to the total wet mass of the hydrated and split first textured vegetable protein fibers. The hydrated and split first textured vegetable protein fibers preferably include those having a length of 5 mm or more, and preferably a length of 10 mm or more. These hydrated and split first textured vegetable proteins having such lengths preferably account for, on the basis of wet mass, 40 mass percent or more and more preferably 50 mass percent or more with respect to the total wet mass of the hydrated and split first textured vegetable protein fibers. These first textured vegetable protein fibers within such size ranges are contained, so that more preferable fibrous sensation of meat-like foodstuffs and a texture similar to that of resilient and firm natural meat can be achieved. The upper limit of the lengths of the hydrated and split first textured vegetable protein fibers is not particularly limited. In general, those having a length of up to about 100 mm may be used. The water content in the hydrated and split first textured vegetable protein fibers preferably ranges from 55 mass percent to 75 mass percent.

The hydrated and split second textured vegetable protein fibers preferably include those having a thickness ranging from 0.1 mm to 12 mm, and preferably a thickness ranging from 2 mm to 10 mm. These hydrated and split second textured vegetable protein fibers having such a thickness preferably account for, on the basis of wet mass, 40 mass percent or more and more preferably 50 mass percent or more with respect to the total wet mass of the hydrated and split second textured vegetable protein fibers. The hydrated and split second textured vegetable protein fibers preferably include those having a length of 5 mm or more and preferably 10 mm or more. These hydrated and split second textured vegetable protein fibers having such lengths account for 40 mass percent or more, and more preferably 50 mass percent or more with respect to the total wet mass of the hydrated and split second textured vegetable protein fibers. These second textured vegetable protein fibers within such size ranges are contained, so that more preferable fibrous sensation of meat-like foodstuffs and a texture similar to that of resilient and firm natural meat can be achieved. The upper limit of the lengths of the hydrated and split second textured vegetable protein fibers is not particularly limited. In general, those having a length of up to about 25 mm may be used. The water content in the hydrated and split second textured vegetable protein fibers preferably ranges from 55 mass percent to 75 mass percent.

One of or both of the above first textured vegetable protein and second textured vegetable protein can be colored and used. The two types of proteins are colored differently, so that a meat-like foodstuff visually similar to natural meat can be provided. For example, for imitation of beef, one type of the protein is colored with a red-based color and the other type of the protein is colored with a white-based color. For imitation of another type of natural meat, it can be prepared by concepts similar to the above.

2. Binder

A binder to be used herein is not particularly limited, as long as it can bind the first textured vegetable protein to the second textured vegetable protein in the step of molding and heating. As a binder, one or more types selected from the group consisting of vegetable proteins, animal proteins, and polysaccharides can be used, for example.

Examples of vegetable proteins to be used as binders include soy proteins and wheat proteins. Examples of animal proteins include egg white, collagen, and milk protein. Examples of polysaccharides include starch, gum substances such as guar gum, and a gelatinizing agent such as carrageenan and glucomannan.

A binder in the form of a paste prepared by kneading with water and/or fats and oils can be added to the raw-material mixture. When the paste is formed, 0.5 to 4 parts by mass of water or fats and oils may be added to 1 part by mass of such a binder (calculated on a dry basis).

Furthermore, a binder is preferably added in the form of an emulsion (preferably, O/W emulsion) prepared by emulsification with water and fats and oils to a raw-material mixture. In this embodiment, the emulsion forms a fat-like tissue in the pseudomeat composition, so that an appearance and a texture (the juicy sensation of fat) even more similar to meat can be imparted. When an emulsion is formed, 0.5 to 3 parts by mass of water and the same of fats and oils can be added to 1 part by mass of the binder (calculated on a dry basis).

As fats and oils, both vegetable edible fats and oils such as soybean oil, cottonseed oil, corn oil, and sesame oil, and animal edible fats and oils such as beef tallow, lard, chicken oil, and butter can be used.

All of or a portion of fats and oils can be substituted with raw materials alternative to fats and oils. An example of such a raw material alternative to fats and oils is an inulin cream that is obtained by heating and dissolving inulin in water. The inulin content in the inulin cream is not particularly limited and can range from 30 to 50 mass percent, for example. Raw materials alternative to fats and oils can be used in an amount and embodiment similar to those for fats and oils. With the above embodiment containing inulin, low-calorie meat-like foodstuffs with low fats and oils can be produced.

At least one binder that forms a heat reversible gel when hydrated can be used. In such a case, the relevant binder is hydrated in advance for the formation of a heat reversible gel. The thus formed heat reversible gel is mixed with another raw material to obtain a raw-material mixture and then the mixture is subjected to the step of molding and heating. The term "heat reversible gel" refers to a gel characterized in that it dissolves when heated and is coagulated when cooled. In this embodiment, the heat reversible gel forms a fat-like tissue in the pseudomeat composition, so that an appearance and a texture (the juicy sensation of fat) even more similar to meat can be imparted. Examples of binders that can form a heat reversible gel when hydrated include carrageenan, glucomannan, and agar. A gel can be formed by adding water at 40 times to 100 times the mass of the binder (dry binder), appropriately heating as necessary, stirring, and then cooling the resultant, for example.

3. Other Raw Materials

The raw-material mixture may further be combined with an enzyme for protein adhesion such as transglutaminase. Through combination with such an enzyme for protein adhesion, bonding between the first textured vegetable protein fibers and second textured vegetable protein fibers, and bonding between these fibers and a binder are strengthened. Moreover, natural meat-like tissue can be obtained and a texture with natural meat-like firmness is enhanced.

The raw-material mixture may further contain water, fats and oils, flavors, seasonings (including animal extracts), starch, and pigments, for example. In particular, a flavor for a taste of a domestic animal meat (e.g., beef, pork, and chicken), an animal extract, or the like is preferably added. As fats and oils, those similar to examples listed above as binders can be used herein.

4. Combination in Raw-Material Mixture

The combination, specifically the ratio of the hydrated and split first textured vegetable protein to the hydrated and split second textured vegetable protein, is not particularly limited and can be appropriately determined depending on the properties of the target pseudomeat. For example, with respect to the total amount (calculated on a dry basis) of the hydrated and split first textured vegetable protein and hydrated and split second textured vegetable protein, the hydrated and split first textured vegetable protein content (calculated on a dry basis) ranges from 10 to 90 mass percent, with a more preferable range being 20 to 90 mass percent, and a particularly preferable range of 40 to 80 mass percent, where the hydrated and split second textured vegetable protein content accounts for the remainder. That is, calculated on a dry basis, it ranges from 90 to 10 mass percent, with a more preferable range of 80 to 10 mass percent, and a particularly preferable range of 60 to 20 mass percent. The two types of textured vegetable protein are used in combination, so that a meat-like foodstuff providing a texture similar to that of natural meat experienced when chewing, and having an appearance similar to that of natural meat can be provided. In particular, non-conventional unique effects can be exhibited such as a texture similar to that of natural meat, even when such a meat-like foodstuff is processed into relatively large shapes such as meat for a steak, meat for a cutlet, or meat for boiling or stewing. When the hydrated and split first textured vegetable protein content is 10 mass percent or more, the resulting meat-like foodstuff provides a natural meat-like fibrous sensation, resiliency, and a particularly preferable non-uniform texture (not a rubber-like texture with an unnatural resiliency). When the hydrated and split first textured vegetable protein content is 90 mass percent or less, the resulting meat-like foodstuff particularly has an easy-to-chew, non-uniform, natural, and preferable texture (not a paper-like unnaturally hard (unchewable) texture).

When a meat-like foodstuff to be processed into a relatively large shape such as meat for a steak, meat for a cutlet, or meat for boiling or stewing is produced, the first textured vegetable protein preferably accounts for 40 to 80 mass percent (calculated on a dry basis) and the second textured vegetable protein preferably accounts for 60 to 20 mass percent (calculated on a dry basis), with respect to the total amount (calculated on a dry basis) of the former and the latter proteins.

A raw-material mixture preferably contains, on the basis of wet mass, 50 to 80 mass percent of a mixture (vegetable protein mixture) of the hydrated and split first textured vegetable protein and the hydrated and split second textured vegetable protein.

Such a raw-material mixture preferably contains 3 to 15 mass percent of a binder (calculated on a dry basis). The raw-material mixture can also contain, on the basis of wet mass, a total of 20 to 50 mass percent of a binder in the form of paste, emulsion, gel, or the like in combination with water, fats and oils, or the like. When a binder in the form of paste is added, the raw-material mixture preferably contains, on the basis of wet mass, 20 to 50 mass percent of the paste. When a binder in the form of hydrated heat reversible gel is added, the raw-material mixture preferably contains, on the basis of wet mass, 3 to 15 mass percent of the gel. When a binder in the form of emulsion is added, the raw-material mixture preferably contains, on the basis of wet mass, 5 to 20 mass percent of the emulsion. The raw-material mixture further preferably contains a binder in the form of paste and a binder in the form of heat reversible gel and/or a binder in the form of emulsion.

When an enzyme for protein adhesion is added, a raw-material mixture contains only an effective amount of such an enzyme sufficient for accelerating the bonding of hydrated and split first textured vegetable protein fibers and second textured vegetable protein fibers, and these fibers to the binder. For example, a raw-material mixture contains 0.01 to 0.5 mass percent (calculated on a dry basis) of the enzyme for protein adhesion.

Other ingredients such as water, fats and oils, flavors, seasonings (including animal extracts), starch and pigments are incorporated into a raw-material mixture in an appropriate amount.

Methods for preparing a raw-material mixture are not particularly limited. Raw materials may be mixed using a general mixer, a kneader, or the like.

5. Step of Molding and Step of Coagulating by Heating

A raw-material mixture is molded into a shape as desired (e.g., the shape of one slice of meat, the shape of a block of meat, and the shape of diced meat). Molding can be performed using an appropriate die.

The molded raw-material mixture is heated at temperatures ranging from 60° C. to 135° C., and preferably ranging from 70° C. to 120° C., so that the molded products are coagulated, and meat-like foodstuffs can be obtained. The molded raw-material mixture is preferably coagulated by heating while sealed within a die for molding, or a vessel such as a retort pouch, a casing, or the like. Molding is not limited to die molding. Any molding method can be employed, as long as the resulting meat-like foodstuff can be shaped as desired, such as a method that involves placing a raw-material mixture into hot water.

6. Meat-Like Foodstuff

The meat-like foodstuff of the present invention may be processed into any shape. When processed and prepared into the shape of meat for a steak or meat for a cutlet having a thickness of about 15 mm or more, or, into the shape of a cube of meat that is about 15 mm or more in size for boiling or stewing such as for curry or stew, or into shapes for fried meat, a chicken nugget, yakitori (char-broiled chicken), beef jerky, ham, sausage, Wiener sausage, salami sausage, hamburger, and meat balls, the meat-like foodstuff of the present invention can create a texture similar to that of natural meat. Disintegrated (e.g., minced) meat-like foodstuffs can be coagulated to prepare the various meat processed foods mentioned above.

The meat-like foodstuff of the present invention is immersed in a brown coloring solution containing soy sauce, mirin (sweet cooking rice wine), table sugar, a caramel pigment, or the like and then baked, so that a food having a roast beef-like appearance with a brown surface can be obtained.

Example 1-1

Production of Dry Vegetable Protein by Extruder Treatment

Textured vegetable proteins containing a soy protein and starch were produced by extruder treatment. Two types of raw-material mixture with different combinations A1 and A2 were prepared as shown in the table below.

TABLE 1

| | A1 (parts by mass) | A2 (parts by mass) |
|---|---|---|
| Delipidized soy flour | — | 15 |
| Powdered soy protein | 72 | 85 |
| Corn starch | 25 | 10 |
| Fats and oils | 1 | 0.4 |
| Citric acid | — | 0.7 |
| Calcium sulfate | 2 | 2 |

The raw-material mixture A1 or A2 was drawn using a twin-screw extruder (L/D=15; D=46 mm) under conditions of 30 Kg/Hr (feed amount of raw materials), 30% added water, barrel heating at 150° C., and a screw speed of 200

RPM. Specifically, the mixture was drawn while being extruded through with the use of a slit die having an opening (3 mm×15 mm) and a thickness of 10 mm in the flow direction of the raw materials provided at the tip portion of the twin-screw extruder and a molding guide connected to the die (12 mm×17 mm, with a thickness of 10 mm), thereby cutting it into lengths of about 60 mm and drying the resultants. All products prepared from the raw-material mixtures A1 and A2 had porous structures, and the cross sections of each such product expanded to a size of about 12 mm×(20 to 25) mm while the water content of each such product was about 9 mass percent.

Textured vegetable proteins produced by the above procedures from the raw-material mixtures A1 and A2 corresponded to a "first textured vegetable protein" and a "second textured vegetable protein," respectively.

(The Hydrated and Split First Textured Vegetable Protein)

The first textured vegetable protein (produced from raw-material mixture A1) was restored to a normal state by boiling in water for 50 minutes and then dehydrated with a centrifugal/dehydrator.

The protein mass after restoration with hot water and dehydration was 2.6 parts with respect to 1 part of the dry mass of the same before restoration with hot water. The first textured vegetable protein after restoration with hot water and dehydration could be torn along the fiber direction and the extrusion direction by treatment with a twin-screw extruder. The dehydrated product was shredded with blunt blades by counter-rotating the blades of a food cutter (Nihon Choriki Co., Ltd., FD-21) and then split, so that 60 mass percent or more of the fibers had a thickness ranging from about 0.1 mm to 6 mm and 60 mass percent of the fibers had a length of about 10 mm or more.

(The Hydrated and Split Second Textured Vegetable Protein)

The second textured vegetable protein (produced from raw-material mixture A2) was restored to a normal state by boiling in water for 20 minutes and then dehydrated with a centrifugal/dehydrator.

The protein mass after restoration with hot water and dehydration was 2.6 parts with respect to 1 part of the dry mass of the same before restoration with hot water. The second textured vegetable protein after restoration with hot water and dehydration could be torn along the fiber direction and the extrusion direction by treatment with a twin-screw extruder. The dehydrated product was shredded with blunt blades by counter-rotating the blades of a food cutter (Nihon Choriki Co., Ltd., FD-21) and then split, so that 50 mass percent or more of the fibers had a thickness ranging from about 2 mm to 10 mm and 50 mass percent of the fibers had a length ranging from about 5 mm to 25 mm.

(Binder)

Inulin (raw material alternative to fats and oils, raw material name: Fuji FF (Fuji Nihon Seito Corporation)) (80 parts by mass) and water (120 parts by mass) were mixed, heated for dissolution, and then cooled, so that an inulin cream comprising 40 mass percent of inulin (raw material alternative to fats and oils) (200 parts by mass) was prepared.

Water (300 parts by mass), the above inulin cream (200 parts by mass), vegetable fats and oils (14 parts by mass), caramel (5 parts by mass), seasoning (44.7 parts by mass), and flavor (2.1 parts by mass) were added to the powdered soy protein (raw material name: Fuji ProF (Fuji Protein Technologies Inc.)) (100 parts by mass). The mixture was stirred for 2 minutes with a vertical mixer into a paste-like form.

(Preparation of Meat-Like Foodstuff)

The above hydrated and split first textured vegetable protein (42.0 parts by mass) and the above hydrated and split second textured vegetable protein (18.0 parts by mass) were mixed (hereinafter, the thus obtained mixture is referred to as "vegetable protein mixture").

At this time, with respect to the total amount (calculated on a dry basis) of the hydrated and split first textured vegetable protein and the hydrated and split second textured vegetable protein, the former protein accounted for 70.0 mass percent and the latter protein accounted for 30.0 mass percent (both calculated on a dry basis). The above powdered soy protein paste as a binder (40.0 parts by mass) was added to the vegetable protein mixture. The mixture was mixed with a vertical mixer for 6 minutes. A standing retort pouch was filled with the mixture and then vacuum sealed. The pouch was boiled in water for 60 minutes to coagulate the raw materials, and then it was sufficiently cooled with ice water, so that a meat-like foodstuff was prepared.

Examples 1-2 to 1-9 and Comparative Examples 1 and 2

Meat-like foodstuffs were prepared in a manner similar to that in Example 1-1 except that the content of each ingredient was varied as shown in the following Table 2 with respect to the total amount (calculated on a dry basis) of the hydrated and split first textured vegetable protein and the hydrated and split second textured vegetable protein.

Each meat-like foodstuff taken out from a standing retort pouch was in the shape of a block of meat (about 1500 g). It was cut into slices of steak meat each having a thickness of 15 mm and a surface area of about 70 cm$^2$, and then the slices were grilled in a frying pan. Thus, the texture of each meat-like foodstuff was evaluated. Table 2 shows the results of the texture evaluation.

TABLE 2

| | First textured vegetable protein (calculated on a dry basis) | Second textured vegetable protein (calculated on a dry basis) | Texture evaluation |
|---|---|---|---|
| Comparative example 1 | 100 | 0 | X Difficult to chew, with a paper-like unnaturally hard (unchewable), and a uniform and artificial texture. |
| Example 1-2 | 90 | 10 | ○ Slight lack of non-uniform texture, but natural texture with fibrous sensation and resiliency similar to natural meat. |
| Example 1-3 | 80 | 20 | ◎ Fibrous sensation, resiliency, and non-uniform texture similar to natural meat. Preferable natural texture like steak. |
| Example 1-1 | 70 | 30 | ◎ Same as above |
| Example 1-4 | 60 | 40 | ◎ Same as above |
| Example 1-5 | 50 | 50 | ◎ Same as above |
| Example 1-6 | 40 | 60 | ◎ Same as above |
| Example 1-7 | 30 | 70 | ○ Slightly strong resiliency, but with fibrous sensation and non-uniform texture similar to natural meat. |
| Example 1-8 | 20 | 80 | ○ Same as above |

TABLE 2-continued

| | First textured vegetable protein (calculated on a dry basis) | Second textured vegetable protein (calculated on a dry basis) | Texture evaluation |
|---|---|---|---|
| Example 1-9 | 10 | 90 | Δ With even stronger resiliency than that of the above, but with fibrous sensation and non-uniform texture similar to natural meat. |
| Comparative example 2 | 0 | 100 | X With unnatural rubber-like resiliency and uniform and artificial texture. |

FIG. 1 shows photographs showing the appearance of the meat-like foodstuffs of Example 1-1. FIG. 1A shows the state of a block of meat, FIG. 1B shows a slice of steak meat, and FIG. 1C shows the state of a grilled slice of the stake meat.

Example 2

Use of Powdered Soy Protein and Heat Reversible Gel as Binder (Binder)

A powdered soy protein paste similar to that of Example 1-1 was prepared. Separately, water (98.0 parts by mass) was added to carrageenan (raw material name: carrageenan CSK-1 (San-Ei Gen F.F.I. Inc.)) (1.2 parts by mass) and glucomannan (raw material name: RHEOLEX RS (Shimizu Chemical Corporation)) (0.8 parts by mass). The mixture was then stirred with a vertical mixer for 2 minutes, and thus a heat reversible gel was obtained.

(Preparation of Meat-Like Foodstuff)

The above powdered soy protein paste (34.0 parts by mass) and the above gel (6.0 parts by mass) were added to the vegetable protein mixture (60.0 parts by mass) (hydrated and split first textured vegetable protein: hydrated and split second textured vegetable protein=70:30 (mass ratio calculated on a dry basis)) obtained in a manner similar to that in Example 1-1, and then a meat-like foodstuff was prepared in a manner similar to that in Example 1-1.

(Evaluation)

Retort curry was cooked using the prepared meat-like foodstuff diced into 20×20×20 mm pieces as an ingredient and then eaten. As a result, the ingredient was found to provide a good sensation of defibration and resiliency and a preferable beef-like texture. Moreover, it had a pleasing flavor because of the uniform permeation of the curry flavor.

Example 3

Use of Emulsion of Binder and Fats and Oils (Preparation of Emulsion)

Guar gum (10 parts by mass), water (100 parts by mass), and vegetable fats and oils (200 parts by mass) were added to powdered soy proteins (raw material name: Fuji ProF (Fuji Protein Technologies Inc.)) (110 parts by mass). The mixture was stirred with a vertical mixer for 5 minutes, and thus an O/W emulsion was obtained.

(Preparation of Meat-Like Foodstuff)

Powdered soy protein paste (30.0 parts by mass) of Example 1 and the above O/W emulsion (10.0 parts by mass) were added to the vegetable protein mixture (60.0 parts by mass) (hydrated and split first textured vegetable protein: hydrated and split second textured vegetable protein=70:30 (mass ratio calculated on a dry basis)) obtained in a manner similar to that in Example 1-1. Then a meat-like foodstuff was prepared in a manner similar to that in Example 1-1.

(Evaluation)

The thus prepared meat-like foodstuff was cut into slices of steak meat, each having a thickness of 15 mm and a surface area of about 70 cm$^2$. The slices were grilled in a frying pan, and then eaten. The slices were found to provide a fibrous sensation and resiliency, good juicy sensation, and a preferable beef-like texture.

Example 4

Addition of Transglutaminase

Powdered soy protein paste (39.8 parts by mass) of Example 1 and transglutaminase (raw material name: Activa TG-AK (AJINOMOTO CO., INC.)) (0.2 parts by mass) were added to a vegetable protein mixture (60.0 parts by mass) (hydrated and split first textured vegetable protein: hydrated and split second textured vegetable protein=70:30 (mass ratio calculated on a dry basis)) obtained in a manner similar to that in Example 1-1. The mixture was then mixed with a vertical mixer for 6 minutes. A standing retort pouch was filled with the mixture and then vacuum sealed. The pouch was heated in hot water at 60° C. for 30 minutes for enzymatic reaction, further boiled in water for 30 minutes for coagulating the raw materials, and then sufficiently cooled with ice water, so that a meat-like foodstuff was prepared.

(Evaluation)

The prepared meat-like foodstuff was cut into slices of steak meat, each having a thickness of 15 mm and a surface area of about 70 cm$^2$. The slices were grilled in a frying pan, and then eaten. As a result, the slices were found to provide a good fibrous sensation, firmness, and a preferable tough beef-like texture.

Example 5

Roast Beef Type (Red Inside and Brown Outside)

(Binder)

Water (190 parts by mass), a red koji (red mold rice) pigment (raw material name: Sun red MA) (18.0 parts by mass), and a flavor (2.0 parts by mass) were added to powdered soy protein (raw material name: Fuji ProF (Fuji Protein Technologies Inc.)) (50 parts by mass). The mixture was then stirred with a vertical mixer for 2 minutes into a paste-like form.

(Preparation of Meat-Like Foodstuff)

The above powdered soy protein paste (36.0 parts by mass) and seasoning (4.0 parts by mass) were added to the vegetable protein mixture (60.0 parts by mass) (hydrated and split first textured vegetable protein: hydrated and split second textured vegetable protein=80:20 (mass ratio calculated on a dry basis)) obtained in a manner similar to that in Example 1-1. The mixture was mixed with a vertical mixer for 6 minutes. A standing retort pouch was filled with the mixture, and then vacuum sealed. The pouch was boiled in water for 60 minutes for coagulating the raw materials and then sufficiently cooled with ice water, and thus a red meat-like foodstuff was prepared.

The above meat-like foodstuff was immersed in a brown coloring solution prepared by mixing soy sauce (50.0 parts by mass), mirin (sweet cooking rice wine) (10.0 parts by mass), table sugar (0.5 parts by mass), and a caramel pigment (0.5 parts by mass) for 30 minutes. The resultant was then grilled in a frying pan to brown the surface. Thus, a food having the appearance of roast beef was obtained.

(Evaluation)

The prepared food having the appearance of roast beef was cut into thin slices, each having a thickness of about 3 mm, and then eaten. The slices were found to have a preferable roast beef-like texture and flavor.

Figure 2:
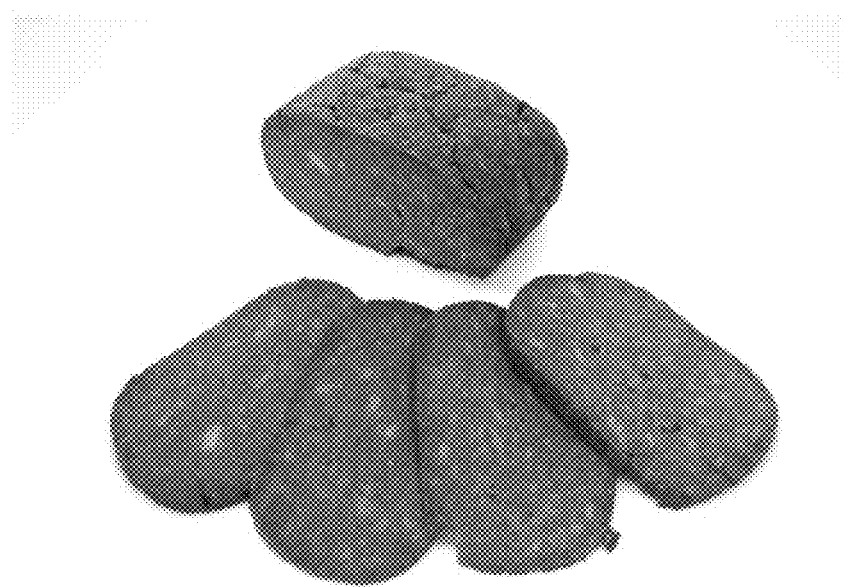
FIG. 2A and FIG. 2B show photographs showing the appearance of foods in the form of the roast beef of Example 5.
Figure 2:
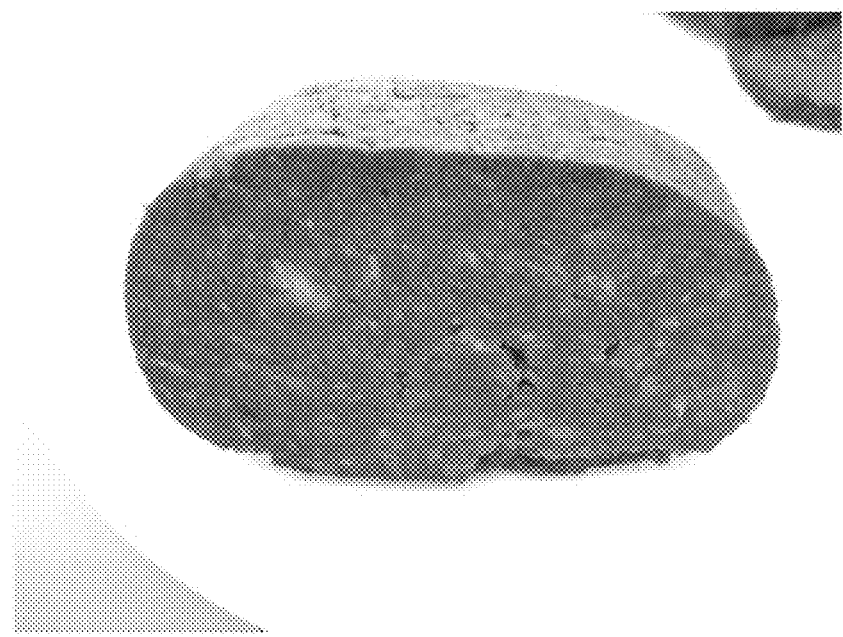

FIG. 2A and FIG. 2B show photographs of the appearance of the prepared roast beef-like food.

Comparative Example 3

Use of Unsplit Vegetable Proteins (The Invention Described in Patent Document 1 was Reproduced Using the First and Second Textured Vegetable Proteins)

(Textured Vegetable Protein Hydrated)

In a manner similar to that in Example 1-1, raw-material mixture A1 was extruded via a die of a twin-screw extruder and then cutted into pieces. Resultants having short lengths were restored with hot water and then dehydrated, so that cylindrical first textured vegetable protein C1 (a bundle not split) was obtained. The first textured vegetable protein C1 after dehydration had a thickness ranging from about 15 mm to 20 mm and a length ranging from about 10 mm to 30 mm.

Furthermore, in a manner similar to that in Example 1-1, raw-material mixture A2 was extruded via a die of a twin-screw extruder and then cutted into pieces. Resultants having short lengths were restored with hot water and then dehydrated, so that cylindrical second textured vegetable protein C2 (a bundle not split) was obtained. The second textured vegetable protein C2 after dehydration had a thickness ranging from about 15 mm to 20 mm, and a length ranging from about 10 mm to 30 mm.

Separately from the above, the commercially available granular vegetable protein (raw material name: Apex 600 (Fuji Protein Technologies Inc.), granular vegetable proteins of soy proteins as standardized under the "Japanese Agricultural Standards for vegetable proteins." The product is produced by texturing a soy protein raw material with an extruder and then dried to form white granules having a particle size ranging from 1 mm to 5 mm) was restored in boiled water for 3 minutes and then dehydrated with a centrifugal/dehydrator, and thus granular vegetable protein D was obtained. The granular vegetable protein D after dehydration had a particle size ranging from about 1 mm to 5 mm.

(Hydrated Fibrous Vegetable Protein)

A frozen product of the hydrated fibrous vegetable protein (raw material name: Fuji Pure SP NC (Fuji Protein Technologies Inc.), a fibrous vegetable protein of soy proteins as standardized under the "Japanese Agricultural Standards for vegetable proteins," red) was left to stand at room temperature for thawing, and then dehydrated with a centrifugal/dehydrator. The mass of the product after dehydration was 0.85 with respect to 1 part of the mass of the same before dehydration. The dry mass of the product was 0.3 with respect to 1 part of the mass of the same before dehydration. 80 mass percent or more of the above fibrous vegetable protein fibers include those having a thickness ranging from about 0.7 mm to 1 mm, and 80 mass percent of the same had a length of about 10 mm or more.

(Binder)

A binder was obtained in a manner similar to that in Example 1-1.

(Preparation of Meat-Like Foodstuff)

The above first textured vegetable protein C1 (70 parts by mass), second textured vegetable protein C2 (30 parts by mass), granular vegetable protein D (18.3 parts by mass), and a fibrous vegetable protein (15.2 parts by mass) were mixed. The above binder (36.0 parts by mass) was added to the mixture and then the mixture was mixed with a vertical mixer for 6 minutes. A standing retort pouch was filled with the mixture and then vacuum sealed. The pouch was boiled in water for 60 minutes for coagulating the raw materials, and then sufficiently cooled with ice water, and thus a meat-like foodstuff was prepared.

(Evaluation)

The appearance of the prepared meat-like foodstuff of comparative example 3 was as follows. Many relatively large white portions (aggregates) corresponding to the textured vegetable proteins were present in the red fibrous vegetable proteins. The prepared meat-like foodstuff had an appearance differing from that of the marbled meat of natural beef.

The retort curry was cooked in a manner similar to that in Example 2, using as an ingredient the meat-like foodstuff of comparative example 3 diced into 20×20×20 mm pieces. Subjects ate the retort curry and evaluated the texture. When the subjects ate the ingredient of comparative example 3, they tasted solid masses and experienced a poor sensation of splitting. In conclusion, the ingredient of comparative example 3 had a texture that was not favorable as a beef-like texture. They also tasted an insufficient permeation of the curry flavor into the portions (aggregates).

INDUSTRIAL APPLICABILITY

A meat-like foodstuff produced by the method of the present invention can provide a texture similar to that of natural meat even when it is processed into a relatively large shape such as meat for a steak, meat for a cutlet, or meat for boiling or stewing. Moreover, the meat-like foodstuff closely resembles natural meat, even in appearance. In addition, when cooked with a liquid food or the like, the meat-like foodstuff will have good flavor because the flavor of the liquid food or the like permeates uniformly.

All publications, patents, and patent applications cited herein are incorporated herein by reference in their entirety.

The invention claimed is:

1. A method for producing a meat-like foodstuff, comprising coagulating by heating a raw-material mixture containing:
   a hydrated and split first textured vegetable protein that is obtained by hydrating and splitting a first textured vegetable protein having been textured by extruder treatment so as to contain a vegetable protein and 0.17 to 0.76 parts by mass of starch with respect to 1 part by mass of the vegetable protein;
   a hydrated and split second textured vegetable protein that is obtained by hydrating and splitting a second textured vegetable protein having been textured by extruder treatment so as to contain a vegetable protein and 0.03 to 0.15 parts by mass of starch with respect to 1 part by mass of the vegetable protein; and
   a binder.

2. The method of claim 1, wherein the hydrated and split first textured vegetable protein content calculated on a dry basis ranges from 20 to 90 mass percent with respect to the total amount of both of:

the hydrated and split first textured vegetable protein, and the hydrated and split second textured vegetable protein calculated on a dry basis.

3. The method of claim 1, wherein the hydrated and split first textured vegetable protein has fibers having a thickness ranging from 0.1 mm to 6 mm, and the hydrated and split second textured vegetable protein has fibers having a thickness ranging from 0.1 mm to 12 mm.

4. The method of claim 1, wherein the hydrated and split first textured vegetable protein has fibers having a length of 5 mm or more, and the hydrated and split second textured vegetable protein has fibers having a length of 5 mm or more.

5. The method of claim 1, wherein the first and second textured vegetable proteins comprise 50 to 80 mass percent of a soy protein.

6. The method of claim 1, wherein the binder is one or more members selected from the group consisting of a vegetable protein, an animal protein, and a polysaccharide.

7. The method of claim 6, wherein the raw-material mixture contains the binder in the form of hydrated heat reversible gel.

8. The method of claim 1, wherein the raw-material mixture further contains an enzyme for protein adhesion.

9. A meat-like foodstuff, which is produced by the method of claim 1.

10. A meat-like foodstuff, which contains:
a hydrated and split first textured vegetable protein that is obtained by hydrating and splitting a first textured vegetable protein having been textured so as to contain a vegetable protein and 0.17 to 0.76 parts by mass of starch with respect to 1 part by mass of the vegetable protein;
a hydrated and split second textured vegetable protein that is obtained by hydrating and splitting a second textured vegetable protein having been textured so as to contain a vegetable protein and 0.03 to 0.15 parts by mass of starch with respect to 1 part by mass of the vegetable protein; and
a binder,
in a mixed state, such that they are combined together by coagulation.

* * * * *